Oct. 23, 1923.
L. O. GRONDAHL
1,471,790
METHOD OF FOCUSING AND DIRECTING HEADLIGHTS
Filed Dec. 13, 1920
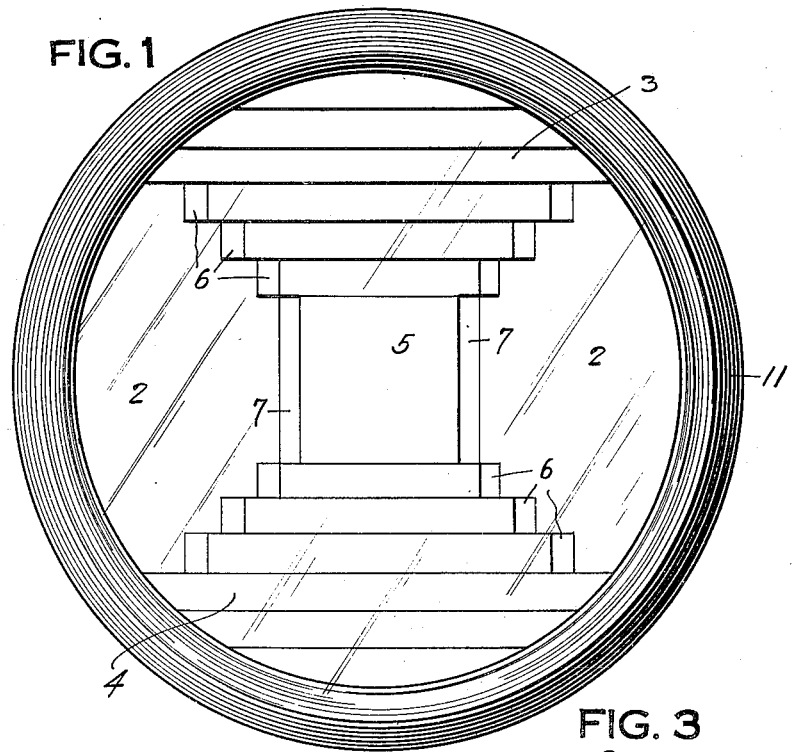
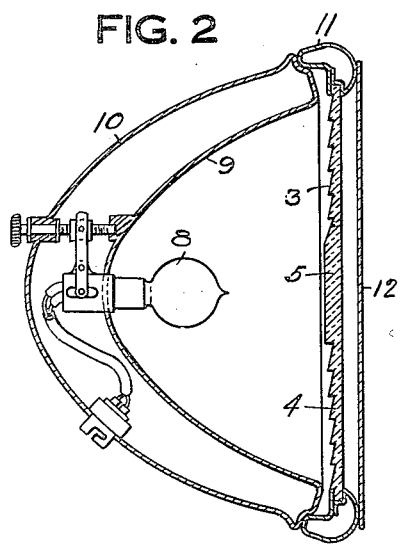
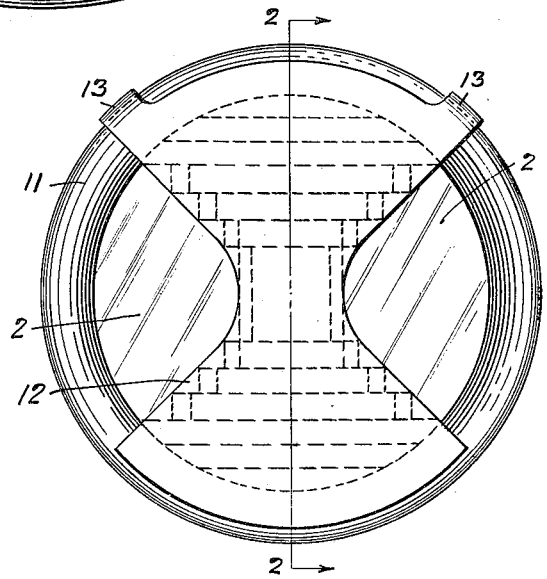
INVENTOR
Lars O. Grondahl
By Kay, Totten & Brown,
Attorneys Patented Oct. 23, 1923.

1,471,790

UNITED STATES PATENT OFFICE.

LARS O. GRONDAHL, OF PITTSBURGH, PENNSYLVANIA.

METHOD OF FOCUSING AND DIRECTING HEADLIGHTS.

Application filed December 13, 1920. Serial No. 430,411.

*To all whom it may concern:*

Be it known that I. LARS O. GRONDAHL, a citizen of the United States, and resident of Pittsburgh, in the county of Allegheny and State of Pennsylvania, have invented a new and useful Improvement in Methods of Focusing and Directing Headlights; and I do hereby declare the following to be a full, clear, and exact description thereof.

My invention relates to automobile headlights and it has for one of its objects to provide an improved method of adjusting the headlight with respect to the focus of its lamp and the direction of its beams, without removing the lens from the headlight and also to provide a method for readily ascertaining whether or not a headlight is in proper focus.

Another object of my invention is to provide a device for use in indicating the adjustment of headlights, such device comprising a screen adapted to be placed temporarily over the headlight to obscure all portions thereof except certain restricted portions which are so arranged as to indicate the adjustment of the headlight by the nature of the light beams which pass through such restricted lens areas.

The ordinary automobile headlight includes an electric lamp placed at the focus of a parabolic reflector which directs the light rays through a lens that is commonly modified by means of prisms of various kinds in order to comply with the laws of various States which regulate the permissible dispersion and brilliance of the light. The headlight lamp is commonly made adjustable in and out of the reflector so that lamps of different sizes may be brought into correct focus. This adjustment is easily disturbed by the jolting of the car and it is necessary to again focus the lamp from time to time. With ordinary forms of headlights it is necessary to remove the lens before focusing the lamp because the light passing through the lens is so modified that a definite image cannot be obtained. Therefore, it is customary to remove the lenses from the headlights and then to direct the headlights upon a wall or the like at a suitable distance, and to move the lamps in and out in the reflectors until the correct focus is obtained. This requires considerable time and trouble and my present invention aims to facilitate the focusing operation by providing a method of determining quickly whether the lamp is in focus or not and, if it is not in focus, for indicating the necessary adjustment.

The modification of the light caused by the lenses also makes it difficult to tell whether the headlights are directed toward the road at the proper angle, and my invention makes possible the correct adjustment of the headlight with respect to direction as well as with respect to focus.

Broadly stated, my improved method consists in providing the headlight lens with one or more areas which I term focus-areas or adjusting areas, and which may or may not transmit a considerable fraction of the total light rays. These focusing areas are so constructed and arranged that when the lamp is properly focused the beams of light passing through these areas will occupy predetermined positions with respect to each other; or, when only one focusing area is employed, will cast a spot of light having predetermined size or shape.

In one modification of my method I cover up the lens with the exception of the focusing areas in order that the light passing through these areas may not be confused with the other rays. In another modification, I leave the entire lens exposed and construct the focusing areas in such a way that their beams are displaced from the beams passing through the main portions of the lens. Thus the focusing beams may be raised slightly above the main beam of the headlight so that the driver of an automobile, when approaching a wall, billboard, or the like, as in rounding curves in the ordinary operation of the car, can tell at a glance whether his lamps are in focus or not by noting the relative positions of the focusing beams.

Another modification of my method consists in coloring the focusing areas so that their beams may be distinguished, and the focusing areas may be given different colors to indicate more clearly the relative positions of the fucusing beams.

For a further understanding of my invention reference may be had to the accompanying drawing, which shows by way of example a headlight provided with means for carrying out my method. Fig. 1 is a front elevational view of the headlight and lens; Fig. 2 is a vertical sectional view taken centrally through the headlight, on the line 2—2, Fig. 3; and Fig. 3 is a front elevational view of the headlight with the focusing screen in place.

The lens shown in the accompanying drawing forms the subject of my co-pending application for Letters Patent, filed February 10, 1920, Serial No. 357,582. This lens comprises side portions 2 which may be the focusing areas of the lens referred to above, and which may consist of perfectly plain glass or may be made slightly prismatic to deflect the light downward to some extent. This downward deflection, however, is preferably less than the deflection produced by the upper and lower groups of horizontal prisms 3 and 4 which are separated by a rectangular central portion 5, having a roughened, coated or otherwise modified surface in order that the light passing through this area shall be diffused. The ends of each of the prisms 3 and 4 are beveled, as shown at 6, to provide small vertical prisms which produce sidewise deflection of a small part of the light rays. Other vertical prisms 7 are provided at the sides of the diffusion area 5.

As shown in Fig. 2, the headlight comprises a lamp 8, a parabolic reflector 9, a casing 10, and a hinged door 11, these parts being such as are ordinarily found in headlights and being here shown for the purpose of illustration only.

Fig. 3 shows a screen 12 of opaque material which, when applied to the front of the headlight, serves to cover the prismatic and diffusing parts of the lens, leaving the adjusting parts 2 exposed. The screen 12 may be provided with any desired means for temporarily placing it over the headlight, such means consisting, for example, of hooked portions 13. Another simple method of attaching the screen is to provide it with a cord or wire near its upper edge, the screen being attached by slipping the cord or wire over the upper edge of the headlight.

It is to be understood that the specific construction of the lens and screen is herein shown and described merely for the purpose of illustrating my invention and that my improved method may be applied equally well to any other form of lens.

I prefer that the focusing parts 2 of the lens be so arranged that the beams passing through them produce spots of light that are superposed when the lamp 8 is in proper focus. While this is the most convenient arrangement, it is entirely possible to modify the position and construction of these focusing areas so that the spots of light will not be superposed but will be at a predetermined distance apart or in a predetermined angular relation when the lamp is in proper focus.

In focusing a headlight according to my improved method, the light is directed upon a suitable wall or the like and the screen 12 is placed over the headlight leaving only the areas 2 exposed. The beams passing through these areas produce illuminated spots on the wall and the relative position of these illuminated spots is plainly seen. If this relative position is not the correct one for proper focusing, the lamp 8 is then moved in and out until the light images are brought into their proper relation, and the screen 12 is removed. The same result may of course be produced if the lens or the reflector is made adjustable instead of the lamp, but the adjustment of the lamp is preferable since this is provided on ordinary commercial headlights.

If the focusing areas 2 are so arranged as to deflect their beams of light away from the main beam of the lamp, the screen 12 may be dispensed with, since the focusing beams are clearly distinguished from the remainder of the light. This is facilitated if the focusing areas are colored, which may easily be done by covering these areas with transparent material of the desired color. As stated above, the focusing areas may be differently colored, if desired, in order to indicate more easily their relative position.

If the lens is provided with only a single focusing area, which may consist of a sector, an annular band, or other definite shape, the correct position of the lamp is shown when the spot of light cast by this area reaches a predetermined size or shape. While this method of adjustment is entirely practicable, the operator must know in advance the correct size or shape of the light spot to be produced, and therefore this method is less convenient than that described above, where two or more beams are merely required to be superposed or brought into some other definite relation.

In addition to focusing the lamp without removing the lens, the screen 12 provides a convenient means for indicating the correct inclination of the headlight. In order to function properly, the headlight must direct most of its rays downward and forward and when the whole surface of the lens is covered with prisms or other light-modifying elements, it is often difficult to determine whether the headlight is properly directed or not. When the prismatic portions of the lens are covered by means of the screen 12 the proper inclination of the headlight may readily be determined by observing the beams passing through the plain or slightly modified areas 2.

My adjusting method may also be employed with many kinds of ordinary commercial lenses, provided that one or more adjusting areas on the lens can be so selected that when the remaining parts of the lens are covered, the light passing through the exposed portion or portions will produce illuminated spots having a definite and a predetermined appearance as to their size, shape or relative position.

It will be evident that advantage may be taken of my invention for ascertaining the condition of a headlight with respect to its focus without the use of any lens at all. This is accomplished by providing a screen such as a disc of paper, cardboard or the like, having two or more openings symmetrically arranged with respect to the center of the screen, and placing this screen over the headlight so that all of the light is obscured except the beams passing through the restricted openings. The position of the spots of light produced by these beams will indicate whether the lamp is in correct focus with respect to the reflector. Such a testing screen may be used to test headlights having no lenses, or having almost any kind of ordinary lens, and a screen of this kind is therefore useful both to the owners of automobiles and to police officers or others having the duty of enforcing headlight laws.

In the appended claims the term "adjusting" is intended to include either the focusing of the light source or the directing of the light from the headlight, or both of these operations.

I claim as my invention:

1. The method of adjusting a headlight provided with a lens having a light-modifying area and also an adjusting area, that comprises placing in front of said lens an opaque screen leaving the said adjusting area exposed, manipulating the headlight until the beam of light passing through the said adjusting area presents a predetermined and clearly visible appearance and then removing the said screen.

2. The method of ascertaining the condition, with respect to its focus, of a headlight provided with a lens having a plurality of light-transmitting areas so arranged that the headlight is properly focused when the beams of light passing through the said lens areas are in predetermined relative positions, that comprises placing in front of the said lens an opaque screen, leaving the said areas exposed, and observing the appearance of the light spots produced by the beams passing through said lens areas.

3. The method of focusing a headlight provided with a lens having a plurality of light-transmitting areas so arranged that the headlight is properly focused when the beams of light passing through the said lens areas are in predetermined relative positions, that comprises placing in front of the said lens an opaque screen covering all portions of the lens except the said areas, moving the light source of the headlight until the said beams of light are brought into the said relative positions, and then removing the said screen.

4. The method of focusing a headlight provided with a lens having a plurality of light-transmitting areas so arranged that the headlight is properly focused when the beams of light passing through the said lens areas produce superposed illuminated areas, that comprises covering all parts of the said lens except the said areas with an opaque screen, moving the light source of the headlight until the said superposed illuminated areas are produced, and then removing the said screen.

5. In the adjustment of a headlight, the step that comprises temporarily covering with an opaque screen all portions of the front of the lens of the headlight except a restricted portion so arranged that the light beam passing through the said restricted portion of the lens presents a predetermined appearance when the headlight is in proper adjustment.

6. In the adjustment of a headlight, the step that comprises temporarily covering with an opaque screen all portions of the headlight except a plurality of restricted portions so arranged that the headlight is properly focused when the light beams passing through the said restricted portions of the lens produce superposed illuminated areas.

7. In the adjustment of a headlight, the steps of temporarily covering with an opaque screen all light-transmitting portions of the headlight except a plurality of restricted portions so arranged that the headlight is properly focused when the light beams passing through the said restricted portions of the lens produce illuminated areas that are in predetermined relative positions, and then removing the said screen.

8. The method that comprises causing a headlight to produce a beam of light rays, segregating a portion of the said rays, the segregated rays composing a relatively small part of the total light emitted by the headlight when in use, and manipulating the said headlight until the segregated rays present a predetermined and clearly visible appearance.

9. The method that comprises causing a headlight to produce a beam of light rays, and diverting certain of the said rays away from the main portion of the said beam for indicating the focal condition of the said headlight, the said diverted rays composing a relatively small part of the total light emitted by the headlight when in use.

10. A device for use in indicating the adjustment of headlights comprising an opaque screen adapted to temporarily cover all parts of the lens of the headlight except one or more restricted adjustment-indicating areas.

11. A device for indicating the adjustment of headlights comprising an opaque screen having an opening therethrough for admitting an adjustment-indicating beam of light.

12. A device for indicating the adjustment of headlights comprising an opaque screen adapted to be placed temporarily over the lens of the headlight, the said screen having a plurality of openings therethrough for admitting adjustment-indicating beams of light having predetermined relative positions when the headlight is not properly focused.

13. A device for indicating the adjustment of headlights comprising a screen adapted to be placed temporarily over the lens of the headlight, the said screen having two restricted openings arranged on one of the diameters of said screen and being otherwise opaque.

14. A device for indicating the adjustment of headlights comprising a screen having two openings arranged on opposite sides of the center of said screen and on one of the diameters thereof and being otherwise opaque.

In testimony whereof I, the said LARS O. GRONDAHL, have hereunto set my hand.

LARS O. GRONDAHL.

Witnesses:
R. D. BROWN,
JOHN F. WILL.